United States Patent [19]
Sato et al.

[11] Patent Number: 5,014,144
[45] Date of Patent: May 7, 1991

[54] MAGNETIC HEAD SLIDER SUPPORTING APPARATUS

[75] Inventors: Taichi Sato, Ishioka; Yoshiharu Mouri, Ibaraki; Kihachiro Tanaka, Ushiku; Yokuo Saitoh; Hiroshi Daito, both of Kanagawa; Tetsuo Masukawa, Odawara; Yoshinori Takeuchi, Ibaraki; Yuzo Yamaguchi, Tsuchiura; Satomitsu Imai, Ibaraki, all of Japan

[73] Assignee: Hitachi, Ltd., Tokyo, Japan

[21] Appl. No.: 366,612

[22] Filed: Jun. 13, 1989

[51] Int. Cl.⁵ .............................................. G11B 5/48
[52] U.S. Cl. .................................................... 360/104
[58] Field of Search .............................. 360/102-104, 360/105-106

[56] References Cited
FOREIGN PATENT DOCUMENTS
0155746 9/1985 European Pat. Off. ............ 360/104

Primary Examiner—A. J. Heinz
Attorney, Agent, or Firm—Antonelli, Terry, Stout & Kraus

[57] ABSTRACT

An apparatus for supporting and reciprocating a magnetic head slider above a rotating magnetic disk comprises a carrying arm having a free end, a flexible base connected at one end thereof to the free end of the supporting arm, a pair of flexible fingers extending from the other end of the flexible base parallel to an axis of the carrying arm and defining therebetween a space, a traverse bar connecting two free ends of the fingers, and a flexible tongued member on which the magnetic head slider to be mounted, one end of the tongued member being connected to the traverse bar and the other end thereof extending into the space with gaps between the tongued member and the fingers and the base. A reduced part of a minimum cross-section is provided in each of the fingers. The reduced part is located between the one end of the tongued member and a center between the one end of the tongued member and the other end of the base.

11 Claims, 7 Drawing Sheets

MAGNETIC HEAD SLIDER SUPPORTING APPARATUS

FIELD OF THE INVENTION AND RELATED ART STATEMENT

The present invention relates to an apparatus for supporting a magnetic head slider for magnetic recording and reproducing A magnetic recording/reproducing apparatus is especially widely used as a data processing unit. The magnetic recording/reproducing apparatus reads and writes data on a surface of a rotating magnetic disk by means of a magnetic head slider. The data are recorded on a plurality of concentric circular tracks on a surface of the magnetic disk. The magnetic head slider is radially reciprocated to be positioned above a required track on the magnetic disk so as to read out and write the data in the track. To this end, a rigid arm supports at one end thereof a magnetic head slider supporting apparatus so as to radially reciprocate it above the magnetic disk. The magnetic head slider supporting apparatus supports the magnetic head slider.

The magnetic disk starts to rotate while the magnetic head slider is pressed against the surface of the magnetic disk. Thereafter, the magnetic disk comes to rotate at a constant rotational speed, the magnetic head slider is lifted from the magnetic disk surface by submicrons, e.g. 0.5 $\mu$m or less. Namely, the magnetic head slider must reciprocate close to and above the surface of the magnetic disk with a constant axial gap therebetween. Accordingly, the magnetic head slider must be supported with sufficient flexibilities in a gap direction, a pitching direction and a rolling direction. To the contrary, the magnetic head slider must have sufficient rigidities in a disk rotating direction, a head slider access direction and a head slider yawing direction.

For this purpose, the improved magnetic head slider supporting apparatus has been proposed, as shown in U.S. Pat. No. 4,167,765 and JP-A-60-209984.

A magnetic recording/reproducing apparatus is recently required to be suitable for a magnetic disk of a large memory capacity. In order to achieve a magnetic disk of large memory capacity, a disk is coated throughout with magnetic medium b plating or sputtering. Accordingly, the smoothness of the magnetic disk is improved and then the adhesive force and the contact start-stop force (i.e. CSS force) applied between the magnetic head slider and the magnetic disk on starting of rotation of the magnetic disk becomes considerably large. In case that a conventional magnetic head slider supporting apparatus is applied to such magnetic recording/reproducing apparatus of large memory capacity, the conventional magnetic head slider supporting apparatus cannot bear such forces and then a flexible member directly supporting the magnetic head slider may break down. Therefore, the conventional magnetic head slider supporting apparatus cannot exhibit its full performance.

OBJECT AND SUMMARY OF THE INVENTION

Accordingly, an object of the present invention is to provide a magnetic head slider supporting apparatus which can bear the adhesive force and the CSS force.

To this end, according to the present invention, provided is an apparatus for supporting and reciprocating a magnetic head slider above a rotating magnetic disk comprising a supporting arm having a free end, a flexible base connected at one end thereof to the free end of the supporting arm, a pair of flexible fingers extending from the other end of the flexible base parallel to an axis of the supporting arm and defining therebetween a space, a traverse bar connecting two free ends of the fingers, a flexible tongued member on which the magnetic head slider to be mounted, one end of the tongued member being connected to the traverse bar and the other end thereof extending into the space with gaps between the tongued member and the fingers between the tongued member and the base, and a reduced part of a minimum cross-section provided in each of the fingers and located between the one end of the tongued member and a center between the one end of the tongued member and the other end of the base.

According to the present invention, the reduced parts in the fingers of the flexible member afford the supporting apparatus a sufficient flexibility so as to follow up undulations on the magnetic disk surface, and another part of the flexible member other than the reduced part has a sufficient resistance against head tangential force, e.g. the adhesive force between the magnetic head slider and the magnetic disk surface.

The above advantages and other features of the present invention will be apparent from the following description of the preferred embodiments taken in connection with the accompanying drawings.

DETAILED DESCRIPTION OF PREFERRED EMBODIMENTS

Figure 1:
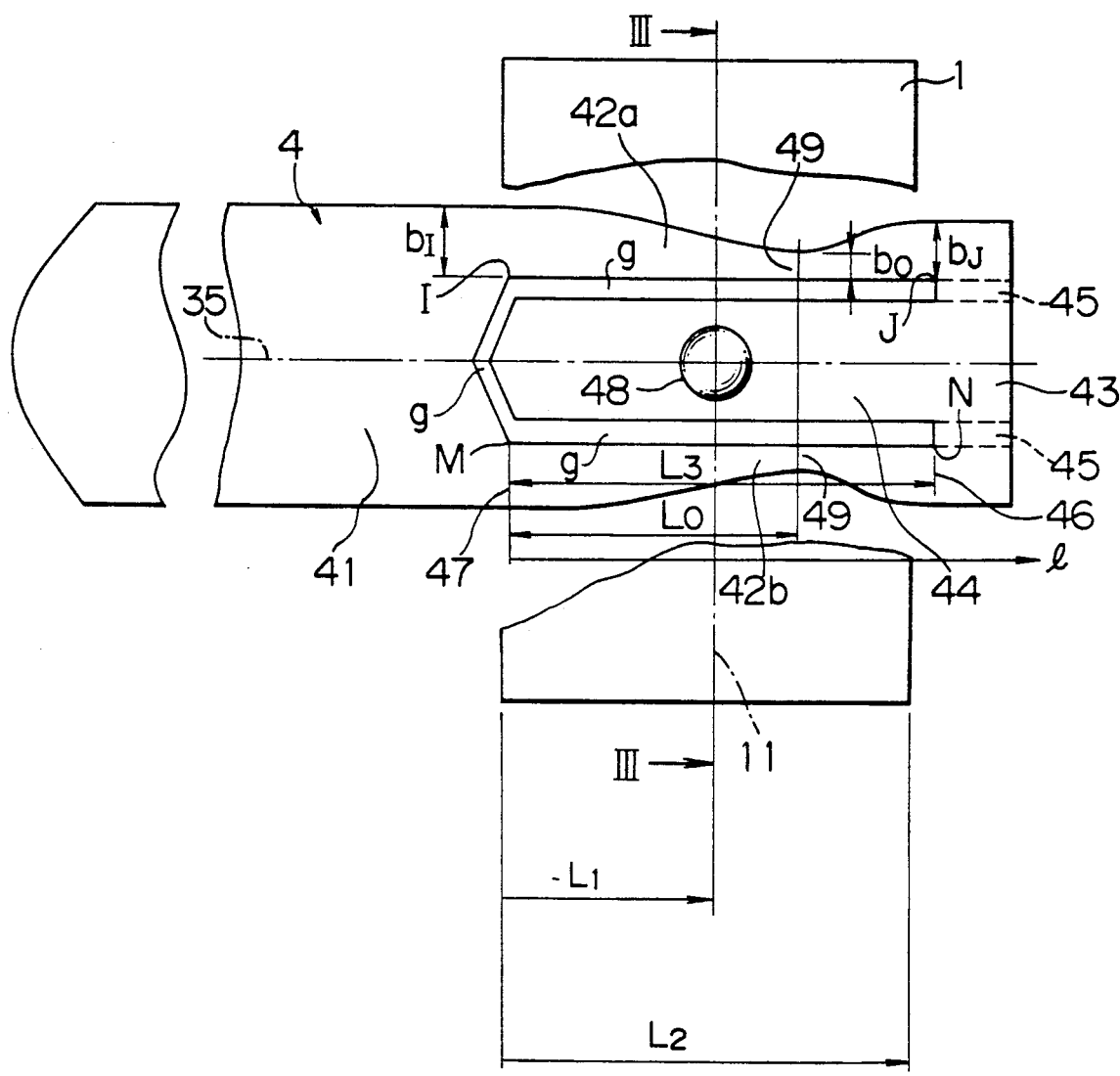
FIG. 1 is an enlarged top plan view showing flexible member shown in FIG. 2.
Figure 2:
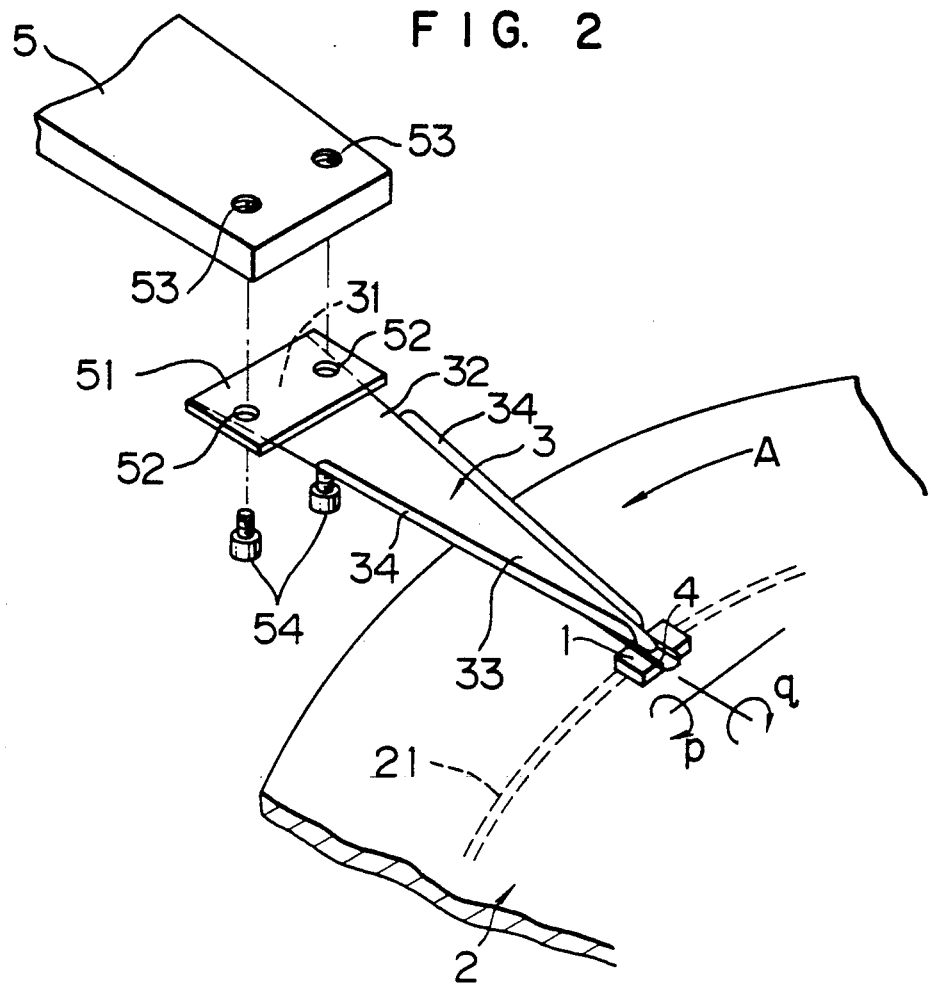
FIG. 2 is a perspective view showing a first embodiment of the present invention.

FIG. 2 shows a magnetic head slider supporting apparatus according to a first embodiment of the present invention, which incorporates a flexible member for carrying a magnetic head slider clearly shown in FIG. 1.

Referring to FIG. 2, a magnetic head slider 1 is adapted to read out and write data in a track 21 on a surface of a magnetic disk 2 which rotates in a direction indicated by an arrow A. A magnetic head slider carrying arm 3 carries at a one end thereof or free end thereof the magnetic head slider 1 through a flexible member 4. The carrying arm 3 is to be fixed at the other end thereof to a rigid arm 5. The rigid arm 5 is connected to a driving apparatus (not shown).

The driving apparatus radially reciprocates the magnetic head slider 1 to allow it to access to arbitrary tracks of the magnetic disk 2. In order to position the magnetic head slider 1 accurately above the desired track 21, a closed-loop servo system controls the driving apparatus.

The carrying arm 3 consists of a mounting portion 31, a elastic spring portion 32, and a triangular flat portion 33 with upright flanges 34. The triangular flat portion 33 carries the magnetic head slider 1 through the flexible member 4.

The elastic spring portion 32 has two significant functions. One is that the elastic spring portion 32 bears the load applied to the portion 33 to lift up the magnetic head slider 1 from the surface of the magnetic disk 2 by a predetermined distance. Namely, the spring portion 32 acts against pneumatic pressure caused by air flowing between the magnetic head slider 1 and the rotating magnetic disk 2. The other is that the elastic spring portion 32 permits the magnetic head slider 1 move in a gap direction so as to follow up the undulations and the deflection of the magnetic disk 2.

The flexible member 4 is rigidly fixed to the magnetic head slider carrying arm 3 by means of fixing means, e.g. welding. The flexible member 4 carries the magnetic head slider 1. The flexible member 4 has a pivot portion (not clearly shown in FIG. 2) through which load from the elastic spring portion 32 is transmitted to the magnetic head slider 1. Namely, the magnetic head slider 1 acts as pivoted pneumatic bearings. The flexible member 4, therefore, exhibits the flexibility against a pitching movement (indicated by an arrow q) and a rolling movement (indicated by an arrow p) of the magnetic head slider 1 about the pivot portion, thereby permitting the magnetic head slider 1 follow up the undulations of the magnetic disk 2 fully. Further, the flexible member 4 can absorb external vibration transmitted from the carrying arm 3 to the magnetic head slider 1.

For this purpose, the flexible member 4 necessitates to be constituted by a thin plate of some tens μm. Therefore, such thin plate structure lowers resistance to the adhesive force and the CSS force as described later in detail.

The carrying arm 3 is mounted to the rigid arm 5 through a spacer plate 51. The spacer plate 51 is, in advance, connected onto the mounting portion 31 of the carrying arm 3 by means of connecting means, e.g. welding or caulking. Holes 52 are provided through the spacer plate 51 and the mounting portion 31 of the carrying arm 3 in advance. The rigid arm 5 is provided with tapped holes 53. The carrying arm 3 is screw-mounted to the rigid arm 5 by means of screws 54.

Figure 3:
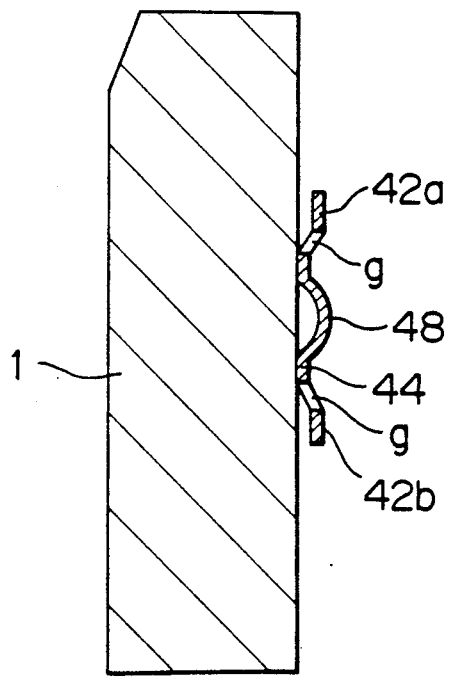
FIG. 3 is a sectional view taken along the lines III—III in FIG. 1.

The resistance of the flexible member 4 against the adhesive force and the CSS force will be explained hereinunder with referring to FIGS. 1 and 3.

Referring to FIG. 1, the flexible member 4 presents a substantial rectangular shape with one round end. The flexible member 4 includes a base portion 41, a pair of finger portions 42a and 42b which extend from the base portion 41 to define a space therebetween and extend parallel to an axis 35 of the carrying arm 3, a flexible traverse bar 43 connecting two free ends of the finger portions 42a and 42b, and a tongued portion 44 which extends parallel to the axis 35 and extends from the traverse bar 43 into the space with providing gaps g between the tongued portion 44 and the finger portions 42, and between the tongued portion 44 and the base portion 41. These portions 41, 42, 43 and 44 are integrated with each other into a whole flexible member 4. The traverse bar 43 is provided with a pair of projections 45.

Regarding the boundaries between the free ends of the finger portions 42 and the traverse bar 43, and between the other ends of the finger portions 42 and the base portion 41 as a tip position 46 and a base position 47, respectively, the finger portion 42 has a length $L_3$ shown in FIG. 1.

The tongued portion 44 is provided with the aforementioned pivot portion 48 which is formed by press working. The magnetic head slider 1 is so fixed to a bottom surface of the tongued portion 44 by means of adhesive agent (FIG. 3) that the magnetic head slider 1 is positioned symmetrical with respect to a line 11 which passes through a top of the pivot portion 48 and is perpendicular to the axis 35. Namely the following relationship is established.

$$L_2 = 2L_1$$

It is well known that the magnetic head slider 1 is subject to force in a direction of rotation of the magnetic disk 2 (indicated by an arrow A in FIG. 2) on starting and stopping of the rotation of the magnetic disk 2 because the magnetic head slider 1 is pressed by the carrying arm 3 to come into contact with the magnetic disk surface. The force is generally referred as the adhesive force or the CSS force. The force is one in a direction of a tangent of the magnetic disk 2. Therefore, hereinunder such force is called as "head tangential force". The head tangential force is transmitted to the flexible member 4 through the magnetic head slider 1. The flexible member 4 must be made to resist such head tangential force. Accordingly, in the first embodiment described above, an outer side edge of each of the finger portions 42a and 42b is smoothly concaved or recessed to form a reduced part 49 of a minimum width in the finger portion. As apparent from FIG. 1, the reduced part 49 of a minimum width provides the respective finger portions with a reduced part of a minimum cross-section and is located between the tip position 46 and a center between the tip position 46 and the base position 47.

Figure 4:
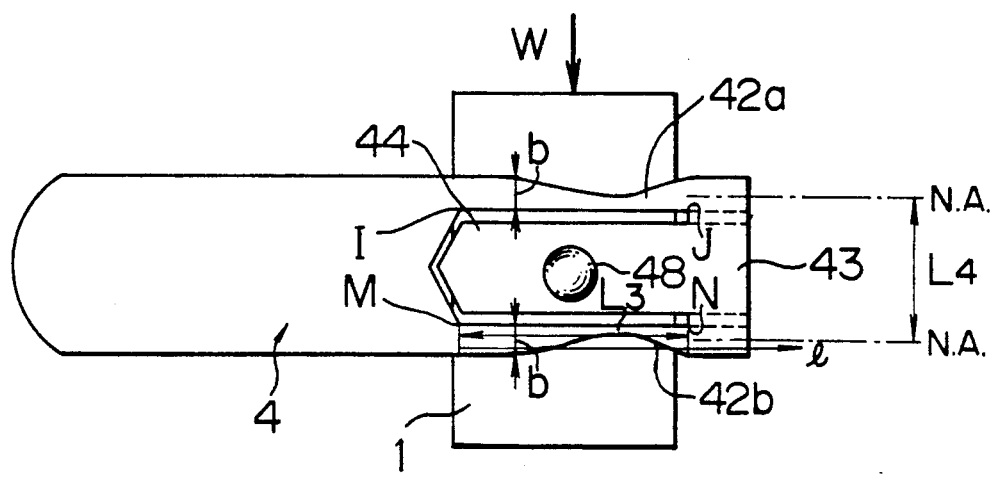
FIG. 4 is a top plan view showing a force W applied to the flexible member.
Figure 5:
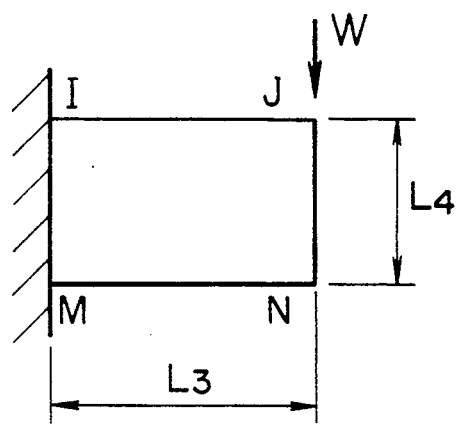
FIG. 5 is a diagram showing a structural model of the flexible member shown in FIG. 4, FIGS. 6 and 6A are a moment diagram of the model shown in FIG. 5 and a stress diagram thereof, respectively.

With referring to FIGS. 4 and 5, mechanical characteristics of the head slider/flexible member structure will be explained hereinunder. FIG. 4 shows such structure to which force W is applied. FIG. 5 shows a rigid frame structural model corresponding to the structure shown in FIG. 4.

In FIG. 5, a member IJ corresponds to the finger portion 42a, a member MN corresponds to the finger portion 42b, and a member JN corresponds to the traverse bar 43. The force W is transmitted to the traverse bar 43 through the tongued portion 44, and then it is possible to regard an axial tension of the member JN as the same as the force W applied thereto.

The moments $M_I$, $M_J$, $M_M$, and $M_N$ in the respective points I, J, M, and N are represented by the following equations, respectively.

$$M_I = - \frac{WL_3(1 - 3k)}{2(1 - 6k)} \quad (1)$$

-continued $$M_J = \frac{WL_3 \cdot 3k}{2(1 + 6k)} \qquad (2)$$

$$M_M = -M_I \qquad (3)$$
$$M_N = -M_J \qquad (4)$$

where $$k = \frac{EI_{JN}/L_4}{EI_{IJ}/L_3},$$

E is Young's modulus, $I_{IJ}(= I_{MN})$ is a geometrical moment of inertia of the member IJ (or MN), and $I_{JN}$ is a geometrical moment of inertia of the member JN. The respective moments are shown in FIG. 6. In the diagram in FIG. 6, the hatched part represents a positive moment part.

The stresses $\sigma_I$ and $\nu_J$ in the points I and J of the member IJ is represented by the following equations, respectively.

$$\sigma_I = \frac{M_I}{Z} \qquad (5)$$

$$\sigma_J = \frac{M_J}{Z} \qquad (6)$$

where, Z is a section modulus.

The absolute value of moment at a point in the member IJ with respect to a distance l from the base position 47 is represented by the following equation.

$$\sigma = \frac{6\left|\frac{M_J - M_I}{L_3}l + M_I\right|}{tb^2} \qquad (7)$$

where, t is a thickness of the finger portion and b is a width thereof.

As described above, the magnetic head slider must be mounted to the slider carrying arm 3 with sufficient flexibilities in the directions of pitching and rolling, respectively. For this purpose, the stiffnesses of the flexible member 4 must be considerably reduced in the directions of pitching and rolling, respectively and then the flexible member 4 is necessarily built up to a thin plate structure of a thickness of some ten μm. On the contrary, the flexible member 4 must have a sufficient stiffness against the head tangential force. The simple increase in the width of the finger portion can not be sufficient to satisfy these contradictory conditions. In order to satisfy these contradictory conditions, it is preferable to make the stress represented by the equation (7) uniform along the distance l.

The width b of the finger portion is determined by the following manner. At first, referring to FIG. 1A which shows the one of the finger portions in detail, the width of base position 47 (l=O) is $b_I$ and the width of tip position 46 (l=L) is $b_J$. Judging from the exertion of force W to the flexible member 4 in FIG. 4, the finger portion is subject to not only bending moment but also shearing force. In order to withstand such shearing force, the finger portion must have at least a width of $b_O$. Accordingly, the width b of the finger portion at a position l (O≦l≦L_3) is represented by a combination of two components as follows.

$$b = b_O + b_B \qquad (8)$$

Since the shearing force is uniform along the distance l, the widths of the finger portion at the base position 47 and at the tip position 46 are also represented, respectively as follows.

$$b_I = b_O + b_{BI} \qquad (9)$$
$$b_J = b_O + b_{BJ}$$

The component $b_B$ (including $b_{BI}$ and $b_{BJ}$) is determined according to the bending moment diagram shown in FIG. 6.

Incidentally, in order to make the explanation simple, it isn't clarified that the width b consists of a component $b_B$ withstanding the bending moment and a component $b_O$ withstanding the shearing force. However, it should be understood that the aforementioned explanation is referred to the width component $b_B$. Namely, the width b in the equation (7) should have been referred as the width component $b_B$.

Figure 1A:
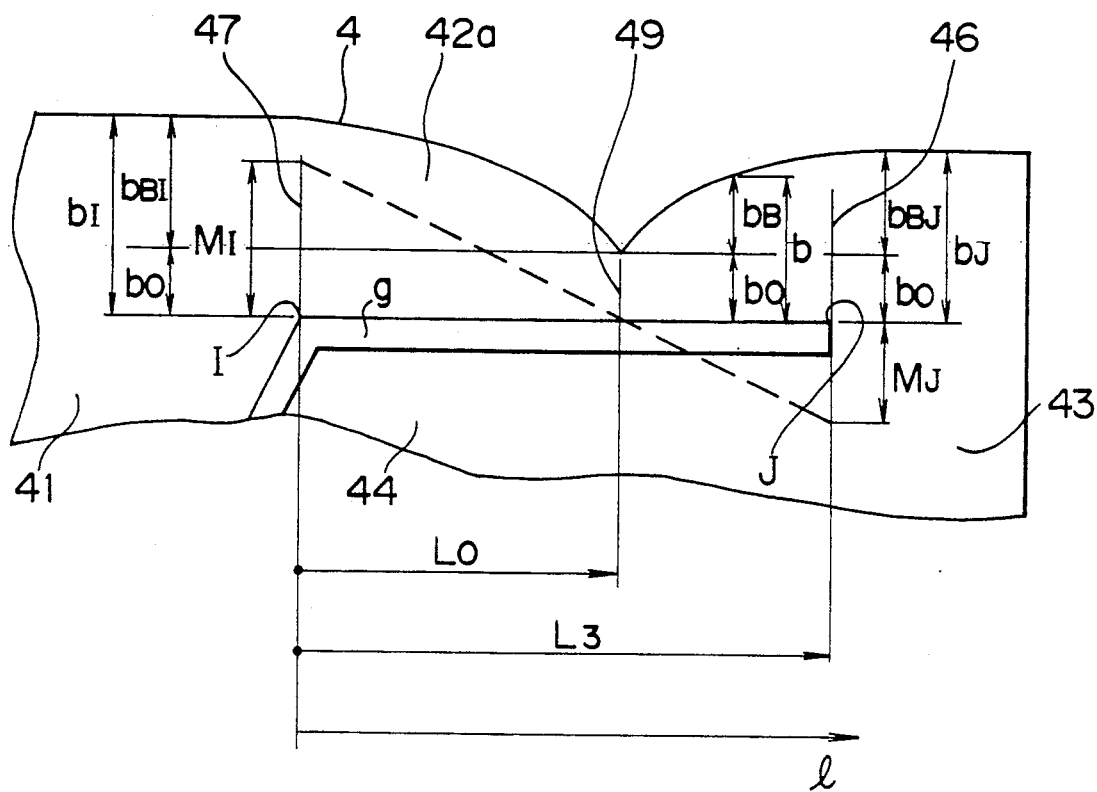
FIG. 1A is an enlarged fragmentary top plan view showing the flexible member shown in FIG. 1.

As clearly shown in FIG. 1A, the width component $b_B$ withstanding the bending moment varies along the distance l so that the stress caused by such bending moment becomes uniform, i.e. the absolute value of the stress is a constant one ($=\sigma_{const}$) at any position in the finger portion. On the basis of the bending moments $M_I$ and $M_J$ at the base position 47 and the tip position 46, respectively obtained from the equations (1) and (2), the position in which the bending moment is zero, i.e. the length $L_O$ is determined as follows.

$$L_O = \frac{M_I L_3}{M_I - M_J} \qquad (10)$$

The width component $b_B$ is determined from the equation (7) as follows.

$$b_B = \sqrt{\frac{6\left(\frac{M_J - M_I}{L_3}l - M_I\right)}{\sigma_{const} \cdot t}} \quad (0 \leq l \leq L_O) \qquad (11)$$

$$b_B = 0 \quad (l = L_O)$$

$$b_B = \sqrt{\frac{6\left(\frac{M_I - M_J}{L_3}l + M_I\right)}{\sigma_{const} \cdot t}} \quad (L_O < l \leq L_3)$$

As apparent from the equation (11), the width component $b_B$ is represented by a quadratic form. The contour of the finger portion shown in FIG. 1A is presented by way of example.

Figure 6A:
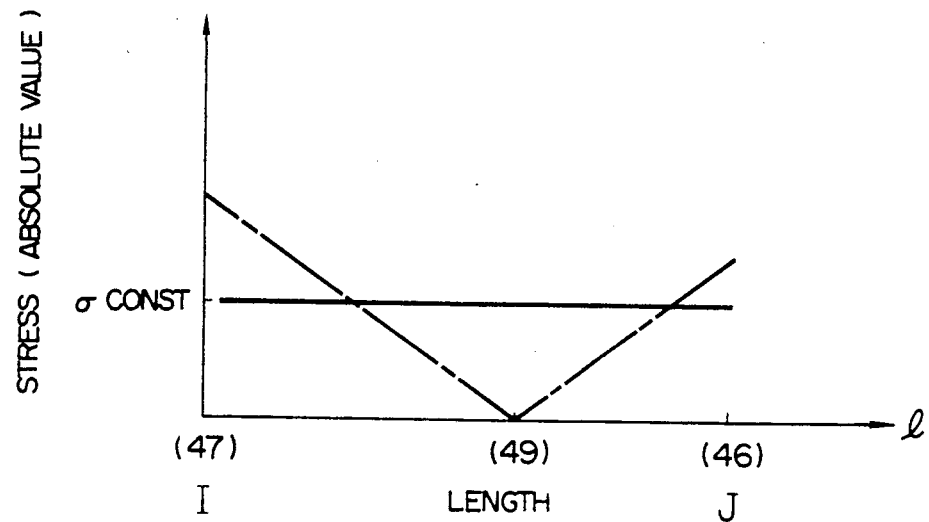
Figure 6:
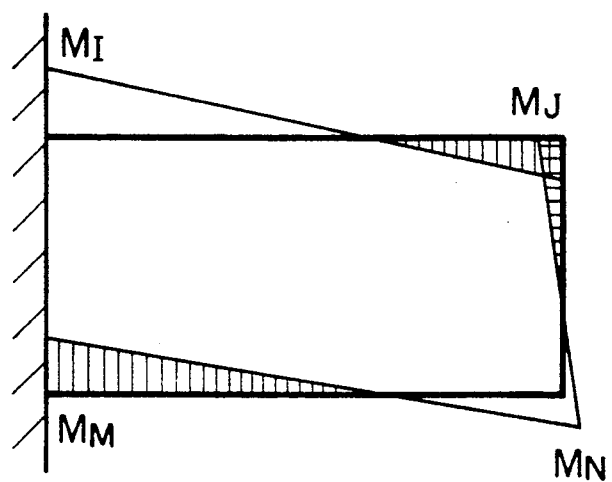

According to this embodiment, as indicated by solid line in FIG. 6A, the stress in the finger portion is generally lowered and becomes uniform. To the contrary, in case that a rectangular flexible member is used as disclosed in U.S. Pat. No. 4,167,765, the stress in the finger portion varies along the distance l as indicated by chain line in FIG. 6A. Accordingly, in the first embodiment, the flexible member 4 has a uniform width throughout and the reduced part 49 in a width of each of finger portions 42a and 42b thereof. The width of the finger portion is s changed that a square value number of a width at a position of the finger portion is in proportion to a magnitude of the moment at the position. Namely, the curvature of the reduced part 49 is represented by a quadratic form. In this case, in a position where the moment is zero, the width of the finger portion must be zero. However, it is practically impossible. Therefore, the width is so smoothly changed that the width of the position of zero moment has a minimum one $b_O$ (FIG. 1). Thus constituted flexible member 4 is called as a "uniform stiffness" one. Assuming that a width of the tip position 46 is $b_J$ and a width of the base position 47 is $b_I$, the following equations will be obtained as apparent from FIG. 1.

$$b_I > b_J \tag{12}$$

$$L_O > L_3/2 \tag{13}$$

The reason why the above equations (12) and (13) are established is that the absolute value of moment at the point I is greater than that at the point J ($|M_I| > |M_J|$), i.e. $|\sigma_I| > |\sigma_J|$, as apparent from the equations (1) to (4), as well as a position of the finger portion of zero stress resides between the tip portion 46 and a center between the tip portion 46 and the base portion 47, which can be derived from the above inequalities.

The above-mentioned relationships are established according to the detailed calculation by means of FEM (Finite Element Method). Incidentally, in this embodiment, a position of the finger portion in which the width thereof is minimum does not coincide with the (rolling) axis 11. In case that the minimum width position does coincide with the rolling axis, as disclosed in JP-A-60-209984, the stress in the finger portion isn't uniform along an axial direction and then it is impossible to obtain a sufficient stiffness against the head tangential force.

Figure 7:
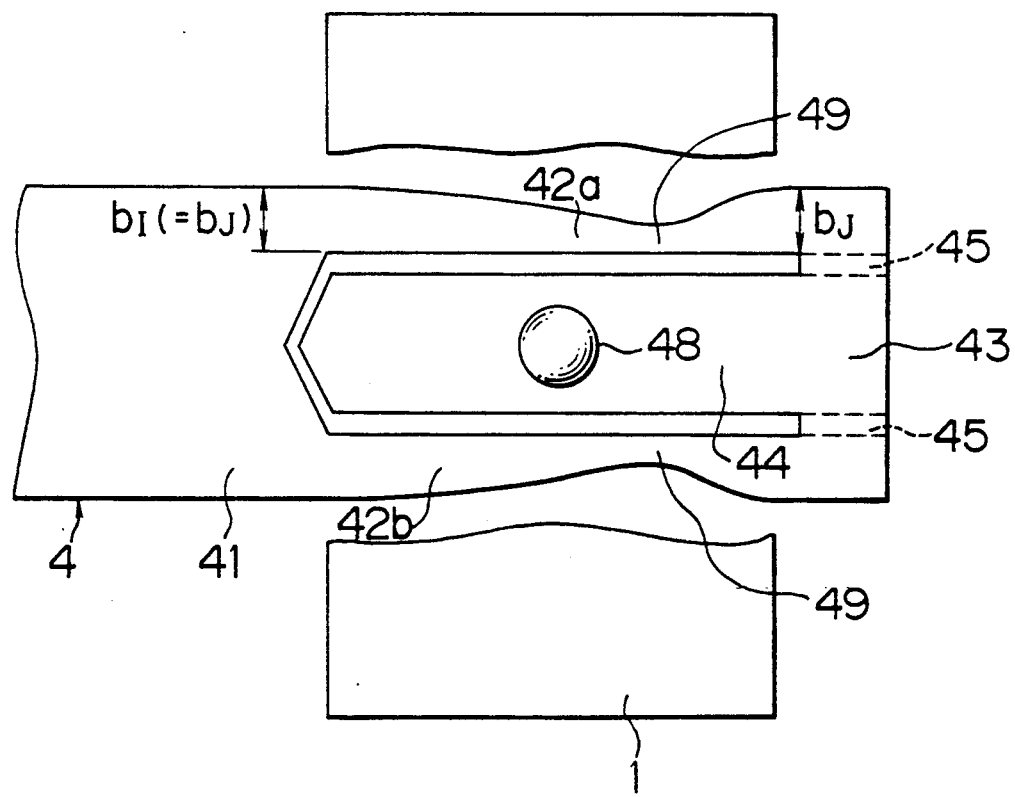
FIGS. 7 to 9 are enlarged top plan views showing flexible members in other embodiments of the present invention.

Next, a second embodiment will be explained hereinunder with referring to FIG. 7. In the second embodiment, the width $b_J$ at the tip portion is identical to the width $b_I$ at the base portion. The other constitution of this embodiment except for the relation between $b_I$ and $b_J$ is substantially identical to that of the first embodiment. This flexible member is suitable to a magnetic head slider having a rectangular groove into which the flexible member is mounted. On the contrary, in case that a magnetic head slider doesn't limit the contour of the flexible member, the flexible member can present a flared shape, i.e. $b_I < b_J$, so as to improve the stifness of the tip part of the finger portion.

Figure 8:
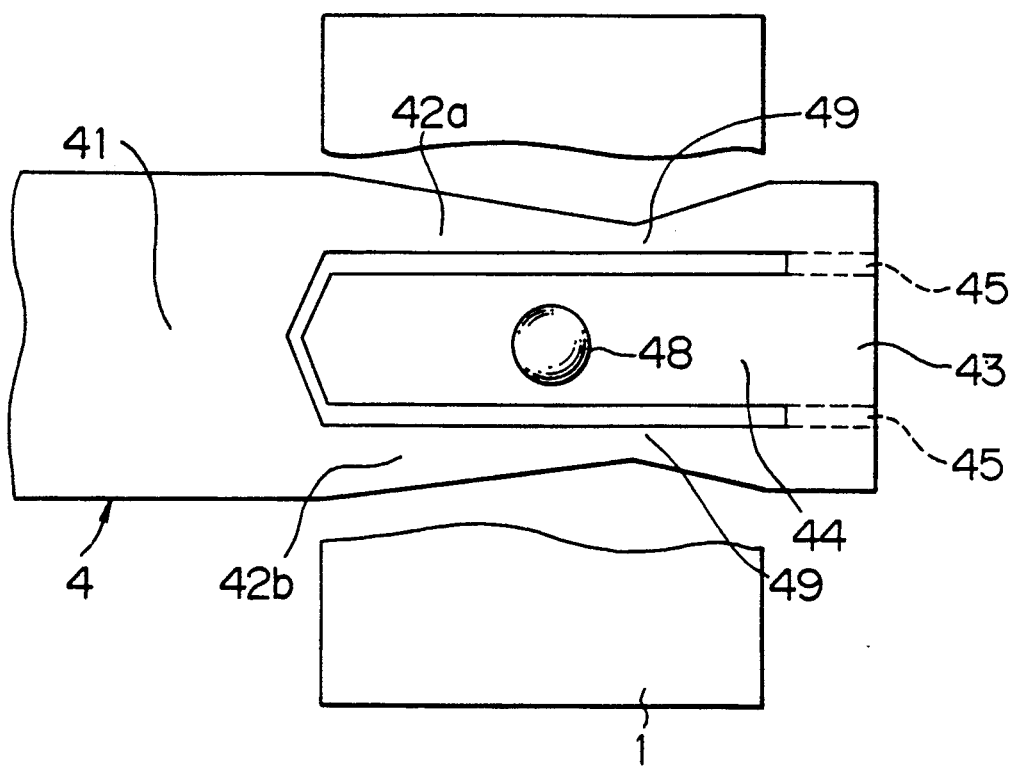

A third embodiment will be explained hereinunder with referring to FIG. 8. In the third embodiment, the width of the finger portion is changed linearly. Namely, the width reduced part of the finger portion is defined by two crossing planes. In a case that it is difficult to change the width of the finger portion in quadratic form, this linear change is preferable.

Figure 9:
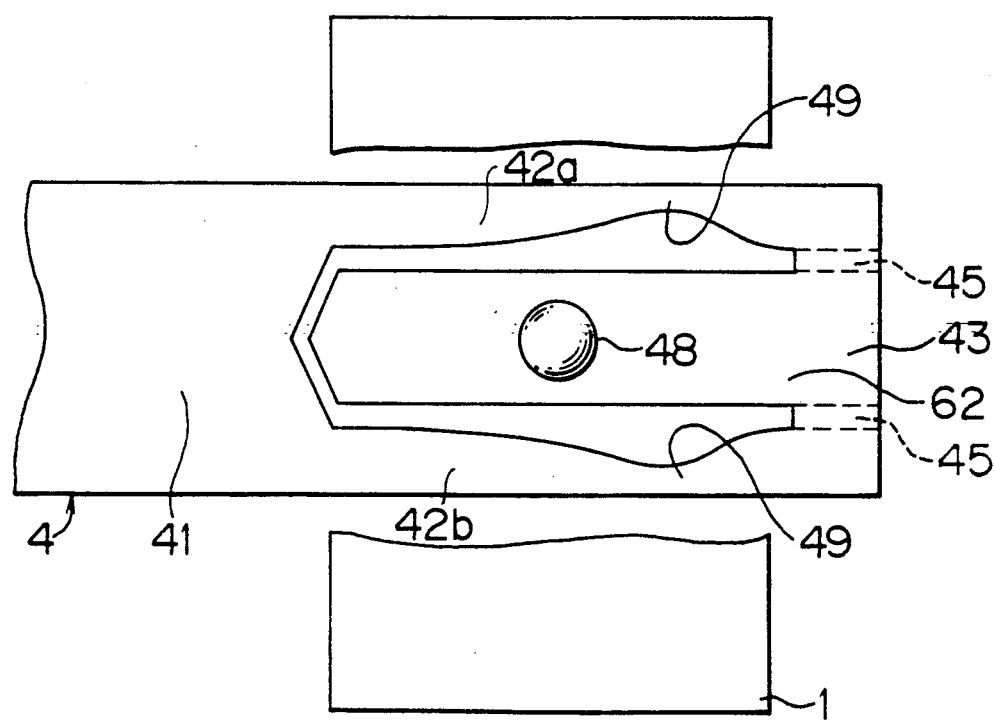

In a fourth embodiment shown in FIG. 9, the width reduced part of the finger portion is formed by changing a width of the gap g. Further, it may be possible to change both of widths of the finger portion and the grooves.

Figure 10:
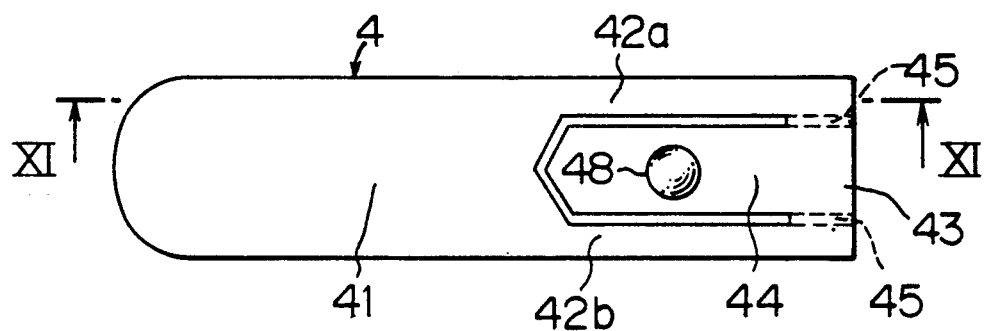
FIG. 10 is a top plan view showing a flexible member in still another embodiment of the present invention.
Figure 11:
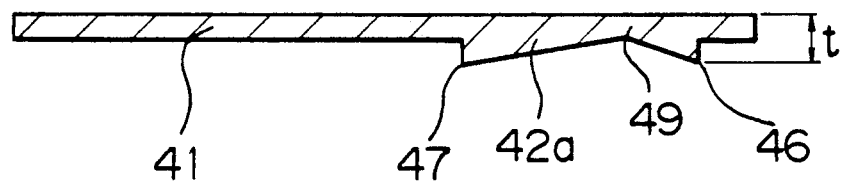
FIG. 11 is a sectional view taken along the lines XI—XI in FIG. 10.

Furthermore, in a fifth embodiment shown in FIGS. 10 and 11, a width of the finger portion is uniform along the length thereof, but a thickness of the finger portion is varied along the length thereof, as shown in FIG. 11, to provide the finger portion with a reduced part of a minimum cross-section. In order to make the stress in any position of the finger portion uniform, as apparent from equation (7), the width of the finger portion is maintained uniform and the thickness at a position thereof is varied so as to be in proportion to the bending moment at the position.

What is claimed is:

1. An apparatus for supporting and reciprocating a magnetic head slider above a rotating magnetic disk comprising a carrying arm having a free and a flexible member, said flexible member including:
   a flexible base having opposite ends, said flexible base being connected at one end thereof to said free end of said supporting arm;
   a pair of flexible fingers extending from the other end of said flexible base parallel to an axis of said carrying arm and defining therebetween a space;
   a traverse bar connecting two free ends of said fingers;
   a flexible tongued member on which said magnetic head slider is to be mounted, one end of said tongued member being connected to said traverse bar and the other end thereof extending into said space with gaps between said tongued member and said fingers and said base; and
   a reduced part of a minimum cross-section provided in each of said fingers, said reduced part being located between said one end of said tongued member and a center between said one end of said tongued member and said other end of said base.

2. An apparatus according to claim 1, wherein said reduced part of a minimum cross-section is so provided in each of said fingers that a moment against a tangential force applied to said flexible member in a direction of rotation of said magnetic disk becomes zero in a rigid frame structure model in which crossing points between said the other end of said base and said one ends of said fingers, and between said the other ends of said fingers and said traverse bar are four supporting points.

3. An apparatus according to claim 1, wherein each of said fingers presents a plate-like shape with a uniform width and with a minimum thickness portion as the reduced part of the minimum cross-section.

4. An apparatus according to claim 1, wherein each of said fingers presents a plate-like shape with a uniform thickness and with a minimum width portion as the reduced part of the minimum cross-section.

5. An apparatus according to claim 2, wherein each of said fingers has the same width at both said ends thereof.

6. An apparatus according to claim 2, wherein each of said fingers has a width at said one end thereof greater than that at said the other end thereof.

7. An apparatus according to claim 1, wherein said reduced part of each of said fingers is defined by a quadratic curved surface.

8. An apparatus according to claim 1, wherein said reduced part of each of said fingers is defined by two linear surfaces intercrossing with each other.

9. An apparatus for supporting and reciprocating a magnetic head slider above a rotating magnetic disk comprising:
   a carrying arm having a free end; and
   a flexible member having opposite ends, said flexible member being connected at one end thereof with said free end of said carrying arm;
   a pair of longitudinal slits formed in said flexible member, each of which extend parallel to an axis of said supporting arm and extends from the other end portion of said flexible member towards said free end of said supporting arm;

a slit for interconnecting said longitudinal slits; and a reduced part of minimum cross-section provided in a portion of said flexible member defined by a side edge of said flexible member and each of said longitudinal slits, said reduced part being located between an end of said longitudinal slit adjacent to said the other end portion of said flexible member and a center between both ends of said longitudinal slit.

10. An apparatus according to claim 9, wherein said longitudinal slit has a uniform width, and wherein said side edge of said flexible member is concaved, thereby presenting said reduced part of minimum cross-section.

11. An apparatus according to claim 9, wherein said longitudinal slit has a widened width, thereby presenting said reduced part of minimum cross-section.

* * * * *